June 7, 1966 J. R. BAUER 3,255,415

RADIO SIGNAL LEVEL CONTROL

Filed Feb. 6, 1963

*INVENTOR*
James R. Bauer

*BY*

*ATTORNEY*

United States Patent Office 3,255,415

Patented June 7, 1966

3,255,415

RADIO SIGNAL LEVEL CONTROL

James R. Bauer, P.O. Box 657, Wendell, N.C.

Filed Feb. 6, 1963, Ser. No. 256,754
2 Claims. (Cl. 325—401)

This invention relates to radio receivers and more particularly to relay controlled circuits for selectively suppressing signals that exceed a predetermined level in receivers that have automatic volume control circuits.

Automatic volume control circuits have been used for many years to reduce fading variations in radio signal levels and to prevent blasting when turning from weak to strong stations. However, somewhat greater protection is needed in communication receivers designed to be used to monitor frequencies available for citizen-band and mobile transmitter type work. A receiver adjusted to monitor a transmitter some twenty to thirty miles away would have its gain control set at an open or high level. If another operator commenced transmission on the same frequency from a position within a mile or less of the receiver it would blast in at an uncontrollable level despite slight A.V.C. disabling or limting the receiver's gain during the period when such excessively loud local transmissions are being received.

One of the purposes of this invention is to provide a means of automatically suppressing or eliminating radio receiver output when the loudness or level of the input signal exceeds a predetermined level.

Another object of this invention is to provide independent sensivity and level controls whereby the operator can manually adjust the sensitivity level at which signal suppression commences and to separately adjust the level or amount of suppression that occurs when the circuit is in operative condition.

A further object of the invention is to devise such a selective signal suppression circuit that derives its input signal from the automatic volume control (A.V.C.) circuit of the radio receiver without affecting the operation of the receiver at low or normal receiver signal levels.

Still a further object of the invention is to provide such an automatic selective signal silencing circuit with so few parts and such small power requirements that it may be built into new receivers or constructed in (adaption) box housing for use with existing receivers and derive its small power requirements from the receiver power supply.

Figure 1:
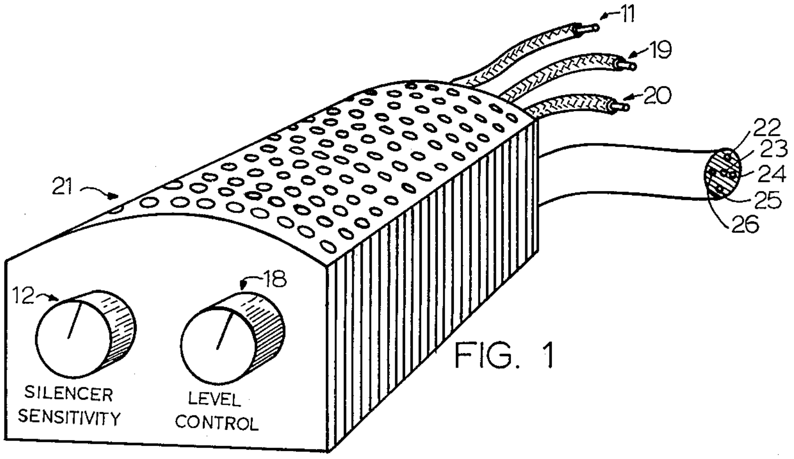
Figure 2:
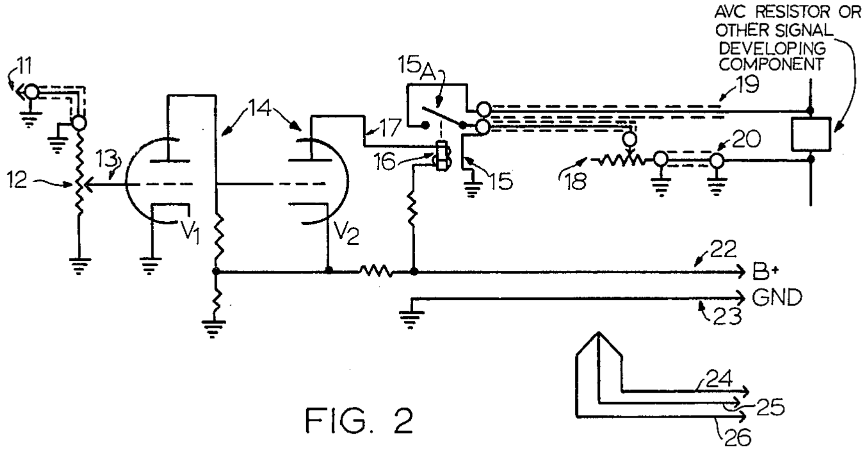

Other objects, advantages and a fuller understanding of the invention may be had by referring to the following description and claims, taken in conjunction with the accompanying drawing in which:

FIGURE 1 shows a perspective of an adaption type housing box in which said auxiliary circuit and controls may be mounted; and FIGURE 2 is a schematic diagram one embodiment of the invention.

With continued reference to the drawings the input signal lead 11 connects to an A.V.C. signal source in the receiver and to an adjustable sensitivity control 12 in the auxiliary control circuit. The input signal lead will ordinarily have to be shielded for proper operation. The signal from input sensitivity control 12 is applied to the control grid 13 of the first stage of a two stage direct coupled amplifier circuit 14. The inventor used a type 12AT7 dual triode in his prototype model of the invention but pentode on other tubes and amplifier arrangements could be used to develop sufficient signal to operate relay 15. Said relay 15 is a pull in relay with normally open contacts 15A which closes when sufficient signal current flows through relay solenoid coil 16. Relay solenoid coil 16 is connected in series with plate lead 17 of V2 and operates to close the relay when a sufficiently large A.V.C. signal is applied to control grid 13 of V1.

An adjustable level control 18 is wired in series with one of the normally open contacts of relay 15 and control signal leads 19 and 20. The control signal leads 19 and 20 are also shielded. The remote end of control signal leads 19 and 20 go to the radio receiver and are connected across a selected component, as hereafter described, in such manner as to limit the output signal produced by the receiver when the relay is closed. The amount of receiver signal produced is controlled by positioning of said adjustable level control.

Since the high sensitivity plate relay is small and the parts involved in the control circuitry are few in number and small in size the entire control circuit can be built directly into equipment manufactured in the future, but for attachment to and use with receivers that do not have such built in control circuitry the inventor's prototype model is separately housed in an adaption type box 21 as shown in FIGURE 1. The unit may be made self powered by building a rectifier power supply into the adaption box housing but the power requirements of the control circuit are so small that power for the inventor's prototype model was drawn from the power supply of the main receiver via plate voltage power supply leads 22 and 23 and filament power supply leads 24, 25 and 26.

The input signal lead 11 may be connected into the associated receiver at any point along the A.V.C. line or any point where there is a negative A.V.C. voltage that varies in proportion to the level of the received signal.

Control signal leads 19 and 20 are to be connected across some selected component in the receiver such that the closing of relay 15 will place adjustable level control 18 in shunt or parallel with said component to cause an attenuation or reduction in the receiver output signal level.

The operation of the circuit may be described as follows: After allowing the receiver to warm up, the operator tunes in a known transmitter approximately twenty miles away and adjusts the volume control for a comfortable listening level. This is a normal adjustment since signals from such a distance will not produce a sufficient A.V.C. voltage to operate the signal suppressor system and close relay 15. Then the operator tunes to another known station within a 5 mile or closer range. This closer station no only produces an uncomfortably larger volume from the receiver speaker but also produces an increased or more negative A.V.C. voltage which is applied to sensitivity control 12 and to the input grid 13 of tube V1. Sensitivity control 12 is then adjusted so that the increased signal from this nearby station applies a more negative voltage to the grid of V1 which causes the plate of V1 and the grid of V2 to go positive permitting sufficient current flow through V2 and relay 15 to pull the relay into closed position. Adjustable level control 18 is then adjusted to shunt or attenuate as much of the receiver output as is necessary to pull this nearby station down to a comfortable or acceptable listening level. Thus it will be seen that distant stations that do not produce sufficient A.V.C. voltage to operate the signal silencer circuit and relay will be received at normal volume while nearby stations on the same frequency which would ordinarily blast in at an obnoxiously loud level will produce sufficient A.V.C. voltage to operate the signal silencer circuit closing relay 15 so that the excess volume of the local station is dissipated or attenuated across the resistance of adjustable level control 18. By making appropriate combination adjustment of the sensitivity control and the adjustable level control both local and distant stations may be heard at the same volume level.

It will be understood that the foregoing description has been presented only as an example of the invention and that numerous changes and rearrangement of equivalent parts may be resorted to achieve the same or similar results without departing from the spirit or scope of the invention as hereinafter claimed.

What is claimed is:

1. In combination with a radio receiver having an audio signal passing component and having an automatic volume control which includes a junction point exhibiting a negative voltage proportional to the level of the received signal; an amplifier having its input connected to said junction point and productive of an output signal proportional to the level of said voltage; a relay connected to the output of said amplifier, said relay including a pair of normally open contacts, said contacts being subjected to being closed upon the level of said amplifier output signal exceeding some predetermined value; a variable resistor connected in series with said contacts, said series circuit comprising said contacts and variable resistor being connected in parallel with said component whereby when said contacts are closed said audio signal is attenuated in an amount determined by the setting of said variable resistor.

2. In the combination of claim 1 including a second variable resistor between and in series with said automatic volume control and amplifier, said second variable resistor enabling said level at which said contacts close to be regulated.

References Cited by the Examiner

UNITED STATES PATENTS 3,060,381 10/1962 Turner et al. ------- 325—362

KATHLEEN H. CLAFFY, *Primary Examiner.*

ROBERT H. ROSE, *Examiner.*

R. S. BELL, *Assistant Examiner.*